US 6,856,066 B2

United States Patent
Takahashi et al.

(10) Patent No.: US 6,856,066 B2
(45) Date of Patent: Feb. 15, 2005

(54) BRUSH DEVICE

(75) Inventors: Terumitsu Takahashi, Shizuoka-ken (JP); Masashi Yamamura, Shizuoka-ken (JP); Kazutoshi Ito, Shizuoka-ken (JP); Hikoshi Izumi, Saitama-ken (JP); Kenji Matsushima, Saitama-ken (JP); Makoto Iizuka, Saitama-ken (JP)

(73) Assignees: JECO Co., Ltd., Gyoda (JP); ASMO Co., Ltd., Kosai (JP)

( * ) Notice: Subject to any disclaimer, the term of this patent is extended or adjusted under 35 U.S.C. 154(b) by 42 days.

(21) Appl. No.: 10/620,789

(22) Filed: Jul. 16, 2003

(65) Prior Publication Data

US 2004/0012295 A1 Jan. 22, 2004

(30) Foreign Application Priority Data

Jul. 19, 2002 (JP) ........................................ 2002-211013

(51) Int. Cl.[7] ............................. H02K 5/14; H01R 39/38
(52) U.S. Cl. .................... 310/245; 310/239; 310/242
(58) Field of Search ................................ 310/238–239, 310/242, 245–247

(56) References Cited

U.S. PATENT DOCUMENTS 3,867,659 A * 2/1975 Seaburg ..................... 310/242
4,375,040 A * 2/1983 Sauerwein .................. 310/239
4,855,631 A * 8/1989 Sato et al. .................. 310/239

FOREIGN PATENT DOCUMENTS

| DE | 3328683 | * 2/1985 | ........... H01R/39/42 |
| DE | 4241404 | * 6/1994 | ........... H02R/39/40 |
| DE | 10048850 | * 4/2004 | ........... H01R/39/38 |
| EP | 304528 | * 3/1989 | ........... H02R/39/40 |
| JP | 2000-175413 | 6/2000 | |
| JP | 2000-324765 | 11/2000 | |

* cited by examiner

*Primary Examiner*—Burton Mullins
(74) *Attorney, Agent, or Firm*—Colin P. Cahoon; Carstens & Cahoon

(57) ABSTRACT

A brush device has a brush that slides against an outer circumferential surface of a cylindrical rotor. The brush device includes a base member, a terminal retained by the base member, an electric wire, which connects the brush to the terminal, and a cylindrical brush holder. The brush holder is located on the base member. The brush holder has a holder axis, which extends along the radial direction of the rotor. The brush is accommodated in and retained by the brush holder and is movable along the holder axis. The brush holder has an opening portion, which is formed at the outer portion of the brush holder with respect to the radial direction of the rotor. The opening portion permits the brush to pass along a direction perpendicular to the holder axis.

15 Claims, 4 Drawing Sheets

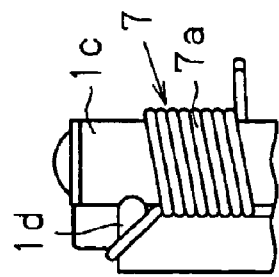
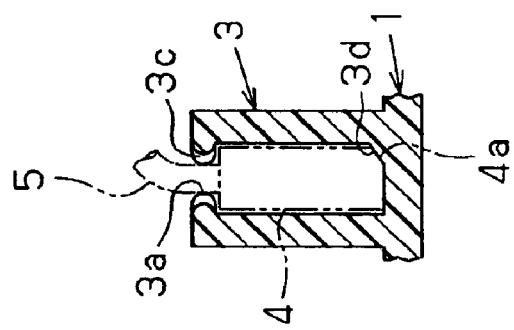
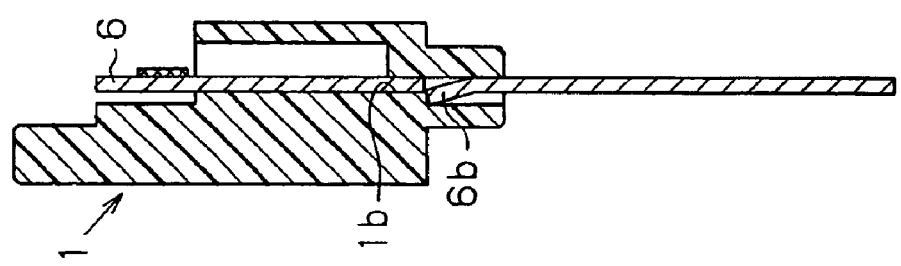

BRUSH DEVICE

BACKGROUND OF THE INVENTION

The present invention relates to a brush device.

A conventional brush device for a DC motor includes a base member, supply brushes, brush holders, and elongated terminals. The supply brushes slide against a cylindrical commutator of the motor. Each brush holder is a substantially rectangular tube and retains one of the brushes. Each terminal is retained by the base member and is connected to one of the brushes with an electric wire. The brush holders are secured to a yoke of the DC motor. Each brush holder has a ceiling that extends in the radial direction of the commutator.

To assemble the brush device, each terminal is inserted into the base member from the axial direction of the commutator and is retained at a predetermined position of the base member. Then, each brush is inserted into one of the brush holders by shifting the brush from the outer portion of the brush holder to the inner portion of the brush holder in the radial direction of the commutator. The proximal end of each brush is urged toward the commutator by a spring so that the distal end of the brush is pressed against the commutator.

When the motor is rotated, the brushes slide against the commutator. Therefore, drive current from the outside is supplied to the motor, or, more specifically, to a coil wound about a core of the motor via the terminals, the electric wires, the brushes, and the commutator.

In the brush device as mentioned above, each brush is inserted into the corresponding brush holder by simply shifting the brush from the outer portion of the brush holder to the inner portion of the brush holder in the radial direction of the commutator. Therefore, the length of the electric wires needs to be set such that each electric wire permits the corresponding brush to be shifted to the outer portion of the corresponding brush holder in the radial direction of the commutator. That is, the length of the electric wires needs to be set to a length that permits assembling of the brushes to the brush holders.

When the terminals are retained in the vicinity of the inner portions of the brush holders, the electric wires become loose after the brushes are assembled. Therefore, the material cost for the part of the electric wires that become unnecessary after the assembly is wasted. Also, the electric wires might be disconnected by, for example, vibration.

SUMMARY OF THE INVENTION

Accordingly, it is an objective of the present invention to provide a brush device that shortens the length of electric wires that connect terminals retained at predetermined positions to brushes.

To achieve the above objective, the present invention provides a brush device having a brush that slides against an outer circumferential surface of a cylindrical rotor. The brush device includes a base member, a terminal, an electric wire, and a cylindrical brush holder. The terminal is retained by the base member. The electric wire connects the brush to the terminal. The cylindrical brush holder is located on the base member. The brush holder retains the brush and has a holder axis, which extends along the radial direction of the rotor. The brush is accommodated in and retained by the brush holder and is movable along the holder axis. The brush holder has an opening portion, which is formed at the outer portion of the brush holder with respect to the radial direction of the rotor. The opening portion permits the brush to pass along a direction perpendicular to the holder axis.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a cross-sectional view taken along line 4—4 in FIG. 1(a);

FIG. 5 is a cross-sectional view taken along line 5—5 in FIG. 2;

FIG. 6 is an explanatory diagram explaining one of support columns and one of torsion springs of the brush device shown in FIG. 1(a);

DETAILED DESCRIPTION OF THE PREFERRED EMBODIMENTS

Figure 1:
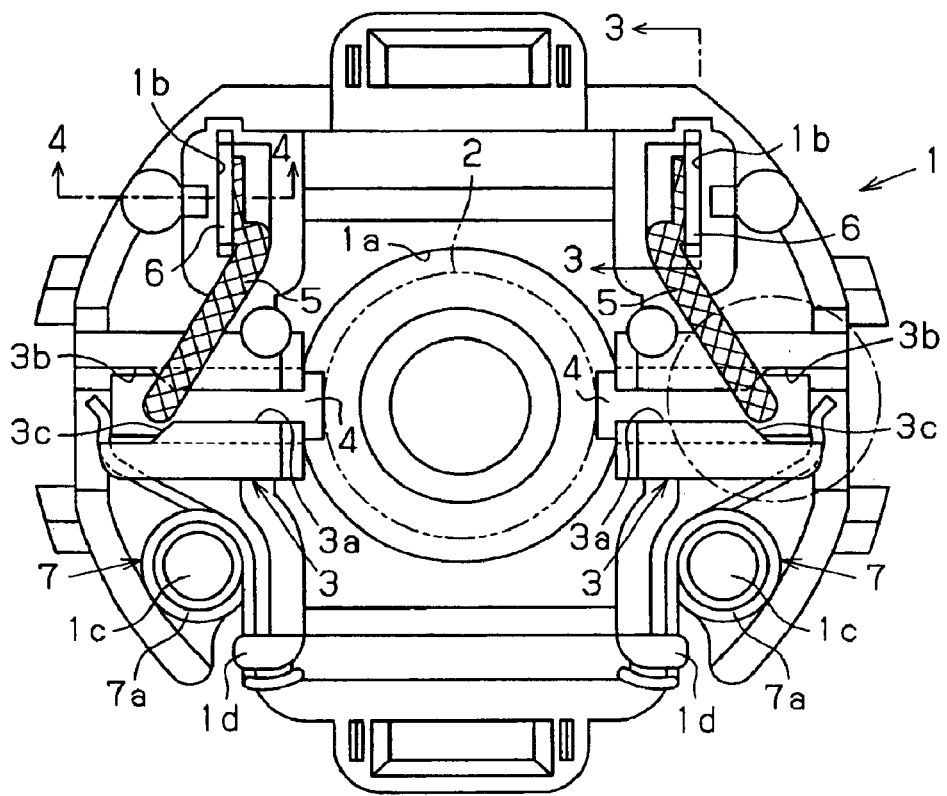
FIG. 1(a) is a plan view illustrating a brush device according to a preferred embodiment of the present invention.
FIG. 1(b) is an enlarged partial plan view illustrating brush holders of the brush device shown in FIG. 1(a)
Figure 1:
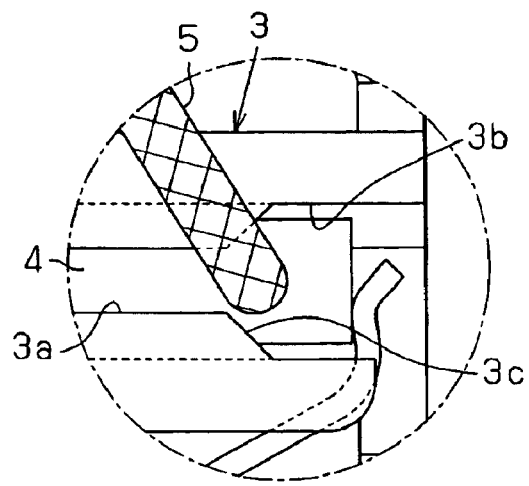

A preferred embodiment of the present invention will now be described with reference to FIGS. 1(a) to 6. FIG. 1(a) shows a base member 1, which is secured to an opening of a yoke (not shown). The base member 1 is formed with a substantially disk-like resin material.

Figure 2:
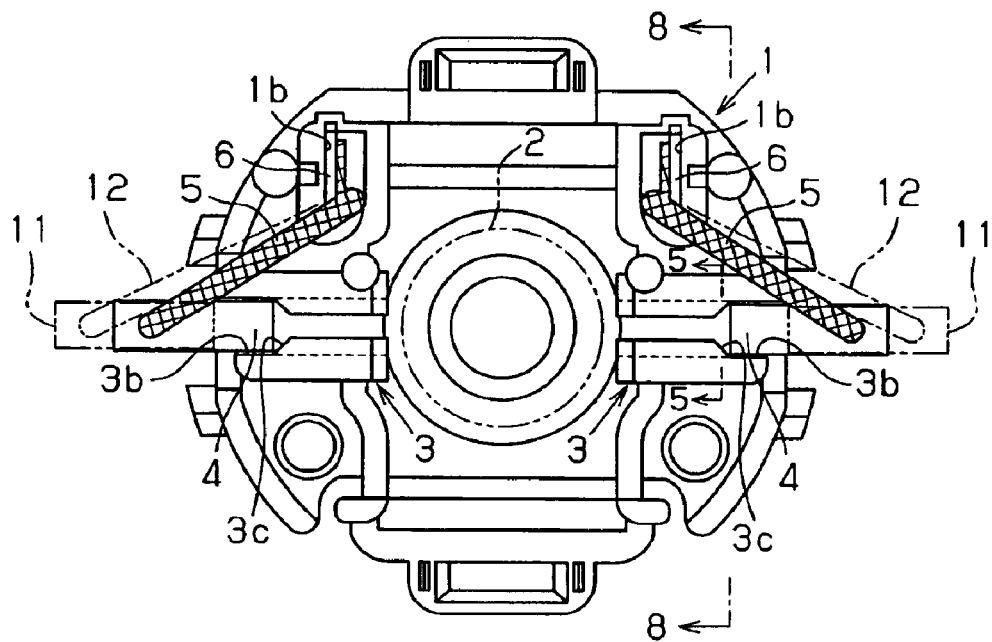
FIG. 2 is an explanatory diagram explaining a state where brushes are assembled to the brush holders of the brush device shown in FIG. 1(a)

A center bore 1a is formed at the center of the base member 1. A cylindrical commutator 2 (shown by a chain double-dashed line in FIGS. 1(a) and 2) of an armature, which is not shown, is inserted through the center bore 1a. A pair of brush holders 3 is located on the base member 1 at intervals of 180 degrees about a rotor, which is the commutator 2 in the preferred embodiment. Each brush holder 3 is substantially a rectangular tube (see FIG. 5) and has a holder axis, which extends in the radial direction of the commutator 2. An opening portion 3b is formed at the outer portion of each brush holder 3 with respect to the radial direction of the commutator 2. As shown in FIGS. 1(a) and 2, two retaining holes 1b are formed in the base member 1. Each retaining hole 1b extends in the axial direction of the commutator 2 and corresponds to one of the brush holders 3. Each retaining hole 1b is located at the middle portion between a portion of the outer circumferential surface of the commutator 2 at which the brush 4 abuts against and the corresponding opening portion 3b with respect to the direction of the holder axis. Two support columns 1c are formed on the base member 1. The support columns 1c are located on the opposite side of the brush holders 3 with respect to the retaining holes 1b. The support columns 1c extend in the axial direction of the commutator 2.

Figure 3:
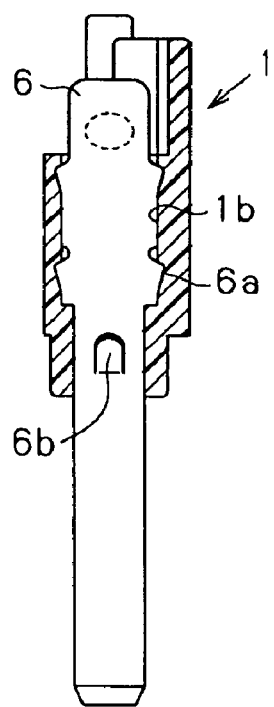
FIG. 3 is a cross-sectional view taken along line 3—3 in FIG. 1(a)

Each brush holder 3 retains a brush 4 to be movable along the holder axis. Each brush 4 is substantially a rectangular column. As shown in FIG. 5, each brush 4 has a corner 4a, which is formed by chamfering one of four edges of the brush 4. Each brush 4 is connected to an elongate plate-like terminal 6 with an electric wire 5 forming one component. As shown in FIGS. 3 and 4, a press-fit portion 6a and a hook 6b are formed at the middle of each terminal 6. The press-fit portion 6a of each terminal 6 can be press-fitted to the corresponding retaining hole 1b. The hook 6b of each terminal 6 prevents the terminal 6 from falling out of the corresponding retaining hole 1b.

As shown in FIGS. 1(a) and 1(b), each brush holder 3 has a ceiling, which is perpendicular to the axis of the commutator 2. A guide hole 3a is formed in the ceiling of each brush holder 3. Each guide hole 3a extends along the holder axis and permits the corresponding electric wire 5 to move along the holder axis with the corresponding brush 4. Each opening portion 3b is formed continuously with the corresponding guide hole 3a. Each opening portion 3b is formed by cutting out part of the ceiling of the corresponding brush holder 3. The distal end of each brush 4 is inserted into the corresponding opening portion 3b from a direction perpendicular to the radial direction of the commutator (axial direction). A coupling portion 3c is formed between each opening portion 3b and the corresponding guide hole 3a. The width of each coupling portion 3c increases radially outward such that the width of the coupling portion 3c in the vicinity of the opening portion 3b is greater than the width of the coupling portion 3c in the vicinity of the guide hole 3a. That is, each coupling portion 3c smoothly connects one of the guide holes 3a to the corresponding opening portion 3b. As shown in FIG. 5, each coupling portion 3c has a substantially semicircular cross-section and has no edge. More specifically, the ceiling of each brush holder 3 has opposing rims that faces each other to define the coupling portion 3c. The opposing portions have curved surfaces. An inclined portion 3d is formed at the lower portion inside each brush holder 3. Each inclined portion 3d is formed at a position corresponding to the corner 4a of each brush 4. The inclination angle of each inclined portion 3d is the same as that of the corner 4a of the corresponding brush 4. In the preferred embodiment, the length of each brush 4 that has not been worn out is substantially the same as the length of each brush holder 3 in the holder axis direction. The length of each guide hole 3a in the holder axis direction is shorter than the length of each brush 4 that has not been worn out.

In the preferred embodiment, the brushes 4 are mounted to the brush holders 3 in the following manner. As shown in FIG. 3, each terminal 6 is inserted into one of the retaining holes 1b from the axial direction, and the press-fit portion 6a of the terminal 6 is press-fitted to the retaining hole 1b to retain the terminal 6. At this time, as shown in FIG. 4, the hook 6b of each terminal 6 is engaged with the opening portion of the corresponding retaining hole 1b so that the terminal 6 is prevented from falling out. The distal end (lower end as viewed in FIGS. 3 and 4) of each terminal 6 projects outside the base member 1, and is connected to a control apparatus (power source), which is not shown.

As shown in FIG. 2, the distal end of each brush 4 is inserted into the corresponding brush holder 3 from the corresponding opening portion 3b by moving the brush 4 in the axial direction (perpendicular to the sheet of FIG. 2) of the commutator 2. Each brush 4 is then shifted radially inward to be accommodated in the corresponding brush holder 3.

Each brush 4 is accommodated in the corresponding brush holder 3 such that the corner 4a of the brush 4 corresponds to the inclined portion 3d of the brush holder 3 as shown in FIG. 5. The length of each electric wire 5 is predetermined such that the distal end of each brush 4 can be arranged above the corresponding opening portion 3b as shown by a solid line in FIG. 2. That is, each electric wire 5 is stretched when the distal end of each brush 4 is located above the corresponding opening portion 3b. Since the longitudinal length of each terminal 6 is far longer than that of each brush 4, each terminal 6 cannot be inserted into the corresponding retaining hole 1b after mounting each brush 4 to the corresponding brush holder 3 if the length of each electric wire 5 is the same.

As shown in FIGS. 1 and 6, a coil portion 7a (annular portion) of a torsion spring 7 is fitted to each support column 1c from the axial direction of the commutator 2. One end of each torsion spring 7 is engaged with one of engaging portions 1d of the base member 1. The other end of the torsion spring 7 abuts against the proximal end of the corresponding brush 4. Each torsion spring 7 presses the proximal end of the corresponding brush 4 so that the distal end of the brush 4 is pressed against the commutator 2.

In a motor that has the brush device formed as described above, the brushes 4 slide against the commutator 2 when the armature (not shown) of the motor is rotated. Therefore, drive current from the control apparatus (not shown) is supplied to the armature, or, more specifically, to a coil wound about an armature core, via the terminals 6, the electric wires 5, the brushes 4, and the commutator 2.

The preferred embodiment provides the following advantages.

(1) Each opening portion 3b is formed at the outer portion of one of the brush holders 3 with respect to the radial direction of the commutator 2. Each opening portion 3b permits the corresponding brush 4 to be inserted along the direction perpendicular to the holder axis direction (the direction perpendicular to the sheet of FIG. 2). The brushes 4 can be mounted to the brush holders 3 by inserting the distal end of each brush 4 into the corresponding brush holder 3 from the direction perpendicular to the holder axis direction (axial direction) through the corresponding opening portion 3b, and then shifting the brush 4 radially inward of the brush holder 3. Therefore, as compared to a conventional brush device in which brushes 11 are simply inserted radially inward from the radially outward ends of the brush holders as shown by chain double-dashed lines in FIG. 2, the length of each electric wire 5, which connects each terminal 6 to the corresponding brush 4, is shortened.

FIG. 2 shows the conventional brushes 11, which are simply inserted radially inward from the radially outward ends of the brush holders, and conventional wires 12 by chain double-dashed lines. FIG. 2 indicates that the conventional wires 12 are longer than the electric wires 5 of the preferred embodiment. Therefore, in the preferred embodiment, the material cost of the electric wires 5 is reduced. Also, a slack of each electric wire 5 after the assembly of the brushes 4 is reduced, which reduces disconnection caused by, for example, vibration.

(2) In the case with a conventional brush device, in which brushes 11 are simply inserted radially inward from the radially outward ends of the brush holders, the position of each brush 11 needs to be adjusted accurately with respect to two axes, which intersect each other (vertical direction as viewed in FIG. 2 and a direction perpendicular to the surface of sheet of FIG. 2), before inserting the brush 11 radially inward of the corresponding brush holder. On the other hand, in the case in which the distal end of each brush 4 is inserted into the corresponding opening portion 3b from the axial direction as in the preferred embodiment, the position of each brush 4 need not be adjusted accurately with respect to two axes. That is, the distal end of each brush 4 can be inserted into the corresponding brush holder 3 by only accurately determining the position of the brush 4 in the axial direction as viewed in FIG. 2. After that, each brush 4 is entirely inserted into the corresponding brush holder 3 only by pushing the proximal end of the brush 4. This facilitates assembling of the brushes 4.

(3) Each opening portion 3b is formed at the upper portion of one of the brush holders 3 to be connected to the corresponding guide hole 3a. Therefore, as compared to a case in which guide holes and opening portions are formed to extend in different directions, the brush holders 3 are easily molded because, for example, slide cores of a mold is reduced. Also, since each opening portion 3b is formed in the upper portion of one of the brush holders 3, which is one of the walls of the brush holder 3 located at the axial ends with respect to the commutator 2, the vibration of the brushes 4 is not varied although an armature is rotated in forward and reverse directions.

For example, when an opening portion is formed in the side wall of each brush holder 3, which is perpendicular to the axis of the commutator 2, part of the proximal end of each brush 4 is not supported by the corresponding brush holder 3. When the armature, which is not shown, is rotated in the forward and reverse directions, the proximal end of each brush 4 that is not supported by the corresponding brush holder 3 becomes unstable during rotation in one of the forward and reverse directions. Therefore, the vibration of the brush 4 is varied. On the other hand, in the preferred embodiment, each opening portion 3b is formed in the upper portion of one of the brush holders 3, which is one of the walls of the brush holder 3 located at the axial ends with respect to the commutator 2. Since each brush holder 3 supports the corresponding brush 4, the vibration of the brush 4 is not varied.

(4) Each opening portion 3b is continuous with one of the guide holes 3a via the corresponding coupling portion 3c. Therefore, each electric wire 5 is prevented from being caught while being shifted from the corresponding opening portion 3b to the corresponding guide hole 3a. Thus, the shifting of the brushes 4 is prevented from being hindered.

(5) As shown in FIG. 5, each coupling portion 3c has a substantially semicircular cross-section and has no edge. Therefore, each electric wire 5 is prevented from being damaged when, for example, the electric wire 5 is shifted from the corresponding opening portion 3b to the corresponding guide hole 3a.

(6) Each terminal 6 is inserted into the corresponding retaining hole 1b from the axial direction of the commutator 2. The distal end of each brush 4 is inserted into the outer portion of the corresponding brush holder 3 with respect to the radial direction of the commutator 2 from the axial direction. The coil portion 7a of each torsion spring 7 is fitted to one of the support columns 1c from the axial direction. Since the assembling direction of each member is the same (axial direction), the members are reliably assembled. Since each member is assembled in the axial direction, the size of the base member 1 in the radial direction is reduced.

(7) The corner 4a is formed on each brush 4 and the inclined portion 3d is formed on each brush holder 3.

Therefore, the proximal end of each brush 4 is prevented from being located radially inward of the commutator 2. That is, each brush 4 is prevented from being assembled to the corresponding brush holder 3 in a wrong direction.

It should be apparent to those skilled in the art that the present invention may be embodied in many other specific forms without departing from the spirit or scope of the invention. Particularly, it should be understood that the invention may be embodied in the following forms.

Figure 7:
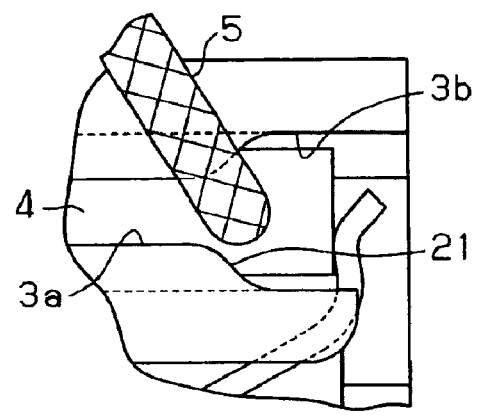
FIG. 7 is an enlarged partial plan view illustrating a brush holder according to a modified embodiment.

As shown in FIG. 7, the coupling portion 21 formed between each guide hole 3a and the corresponding opening portion 3b may be formed such that a portion between the guide hole 3a and the coupling portion 21 and a portion between the opening portion 3b and the coupling portion 21 have smooth arcuate forms.

As long as the distal end of each brush 4 can be inserted into the corresponding brush holder 3 from the axial direction of the commutator 2, each opening portion 3b need not be formed in the ceiling of the brush holder 3 but may be formed in, for example, one of the side walls in the circumferential direction of the brush holder 3. In this case, the distal end of each brush 4 is inserted into the corresponding brush holder 3 from diagonally above the brush holder 3.

Figure 8:
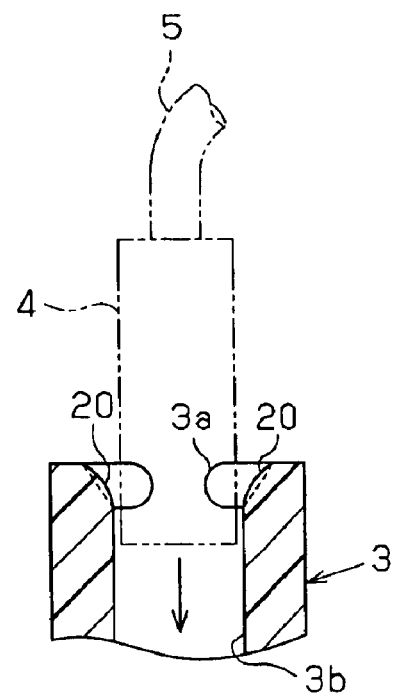
FIG. 8 is a cross-sectional view illustrating another modified embodiment taken along line 8—8 in FIG. 2.

As shown in FIG. 8, each brush holder 3 may have a pair of opposing portions 20 that faces each other to define the opening portion 3b. The opposing portions 20 form a guide portion that guides an entry of the corresponding brush 4 to the opening portion 3b. The opposing portions 20 have curved surfaces so as to function as the guide portion. The opposing portions 20 may be formed to have tapered surfaces as shown by dotted lines in FIG. 8. With this structure, each brush 4 can be easily inserted into the corresponding brush holder 3 from the axial direction of the commutator 2, or in a direction indicated by an arrow in FIG. 8, without damaging the brush 4.

The coupling portions 3c may be changed to any shape other than a substantially semicircular shape as long as the coupling portions 3c have no edge.

Instead of the torsion springs 7, other urging means, such as compression coil springs, may be used.

The terminals 6 need not be inserted into the retaining holes 1b to be secured to the base member 1 as long as the terminals 6 are required to be retained at predetermined positions of the base member 1 before the brushes 4 are assembled to the brush holders 3.

The corner 4a of each brush 4 and the inclined portion 3d of each brush holder 3 may be omitted.

The brush holders 3 may be formed separately from the base member 1.

The present examples and embodiments are to be considered as illustrative and not restrictive and the invention is not to be limited to the details given herein, but may be modified within the scope and equivalence of the appended claims.

What is claimed is:

1. A brush device having a brush that slides against an outer circumferential surface of a cylindrical rotor, the brush device comprising:
   a base member;
   a terminal retained by the base member;
   an electric wire, which connects the brush to the terminal; and
   a cylindrical brush holder located on the base member, wherein the brush holder retains the brush, wherein the brush holder has a holder axis, which extends along the radial direction of the rotor, and wherein the brush is accommodated in and retained by the brush holder and is movable along the holder axis, wherein the brush holder has an opening portion, which is formed at the outer portion of the brush holder with respect to the radial direction of the rotor, and wherein the opening portion permits the brush to pass along a direction perpendicular to the holder axis.

2. The brush device according to claim 1, wherein the brush holder is a substantially rectangular tube.

3. The brush device according to claim 1, wherein the opening portion permits the brush to pass along the axial direction of the rotor.

4. The brush device according to claim 3, wherein the brush holder has a ceiling, which is perpendicular to an axis of the rotor, and wherein the opening portion is formed by cutting out part of the ceiling.

5. The brush device according to claim 3, wherein the brush holder has a ceiling, which is perpendicular to an axis of the rotor, wherein the ceiling has a guide hole, which extends along the holder axis and is connected to the opening portion, and wherein the guide hole permits the electric wire to pass through.

6. The brush device according to claim 5, wherein the width of the opening portion is greater than the width of the guide hole, wherein a coupling portion is formed between the guide hole and the opening portion, and wherein the coupling portion smoothly connects the guide hole to the opening portion.

7. The brush device according to claim 6, wherein the width of the coupling portion gradually increases such that the width of the coupling portion in the vicinity of the opening portion is greater than the width of the coupling portion in the vicinity of the guide hole.

8. The brush device according to claim 6, wherein the ceiling has opposing rims, which face each other to define the coupling portion, and wherein the opposing rims have curved surfaces.

9. The brush device according to claim 1, wherein the brush holder has opposing portions, which face each other to define the opening portion, wherein the opposing portions form a guide portion, and wherein the guide portion guides the brush to enter the opening portion.

10. The brush device according to claim 9, wherein the opposing portions of the brush holder are tapered or curved to function as the guide portion.

11. The brush device according to claim 1, wherein the base member has a retaining hole, which extends along the axial direction of the rotor, and wherein the terminal is inserted into the retaining hole to be retained by the base member.

12. The brush device according to claim 11, further comprising a torsion spring, which urges the brush toward the rotor, wherein the base member has a support column, which extends along the axial direction of the rotor, and wherein an annular portion of the torsion spring is fitted to the support column.

13. The brush device according to claim 1, wherein the terminal is a flat plate, wherein the electric wire is connected to a flat surface of the terminal, and wherein the flat surface of the terminal is perpendicular to the holder axis.

14. The brush device according to claim 13, wherein the terminal is located at a middle portion between the opening portion and a portion of the outer circumferential surface of the rotor that contacts the brush with respect to the direction of the holder axis.

15. A motor having a brush device that has a rotatable cylindrical commutator and a brush that slides against an outer circumferential surface of the commutator, the brush device comprising:

a base member;

a terminal retained by the base member;

an electric wire, which connects the brush to the terminal; and a cylindrical brush holder located on the base member, wherein the brush holder retains the brush, wherein the brush holder has a holder axis, which extends along the radial direction of the commutator, and wherein the brush is accommodated in and retained by the brush holder and is movable along the holder axis, wherein the brush holder has an opening portion, which is formed at the outer portion of the brush holder with respect to the radial direction of the commutator, and wherein the opening portion permits the brush to pass along a direction perpendicular to the holder axis.

* * * * *